UNITED STATES PATENT OFFICE.

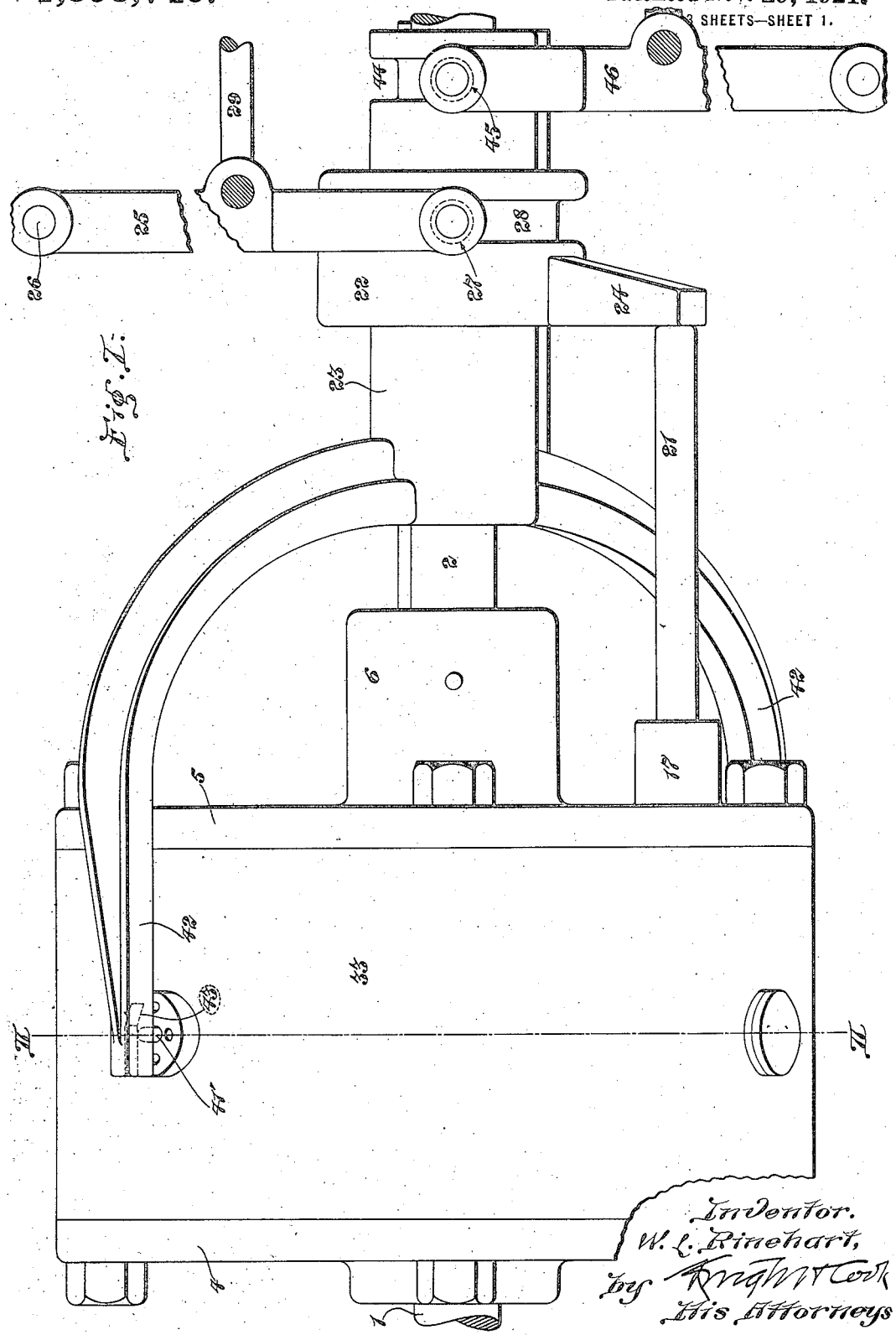

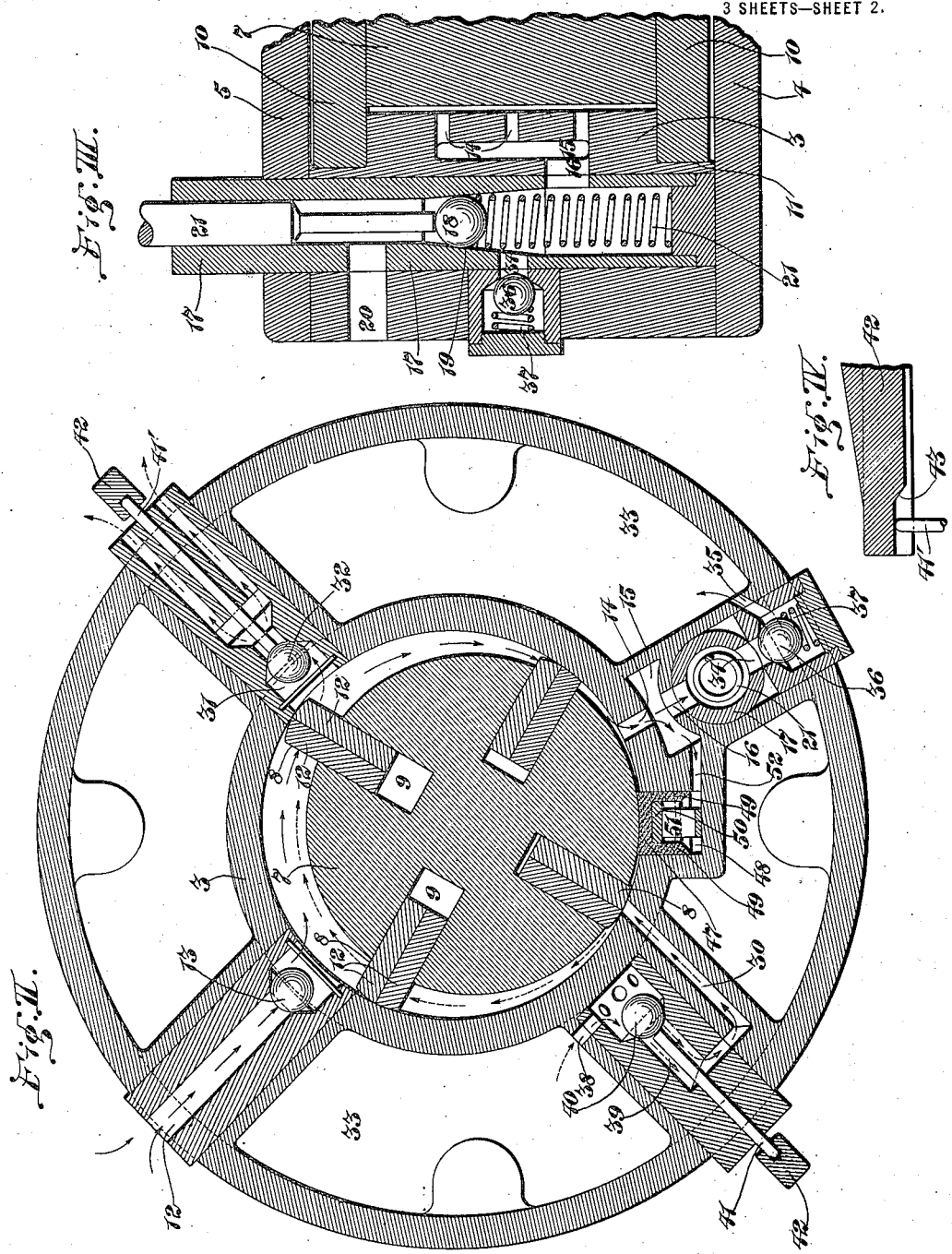

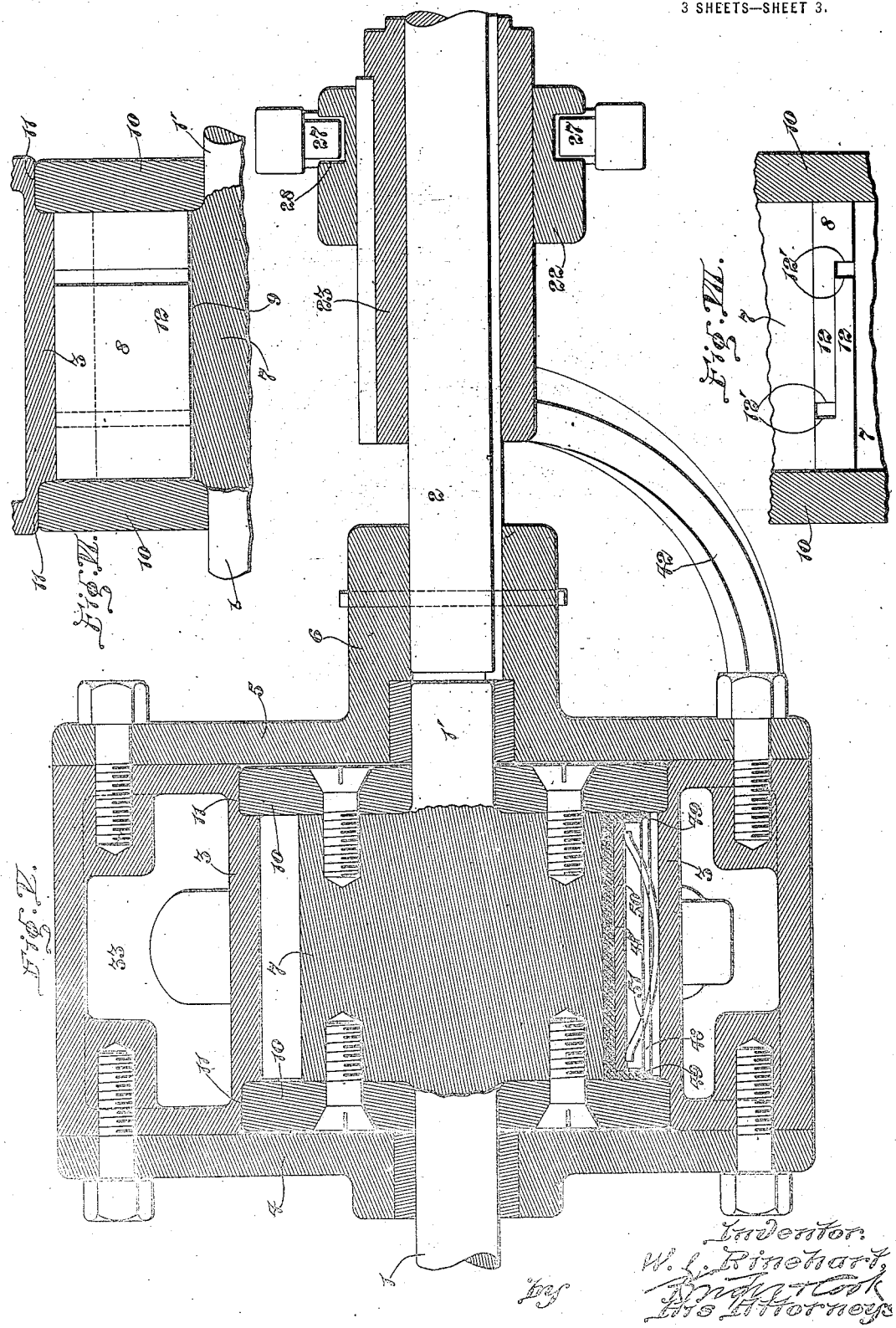

WILLIAM L. RINEHART, OF ST. LOUIS, MISSOURI.

POWER-TRANSMISSION DEVICE.

1,398,740. Specification of Letters Patent. Patented Nov. 29, 1921.

Application filed July 2, 1919. Serial No. 308,232.

*To all whom it may concern:*

Be it known that I, WILLIAM L. RINEHART, a citizen of the United States of America, a resident of the city of St. Louis, in the State of Missouri, have invented certain new and useful Improvements in Power-Transmission Devices, of which the following is a full, clear, and exact description, reference being had to the accompanying drawings, forming a part of this specification.

My invention relates to improvements in power transmission devices, and more particularly to a device of this kind in which the power is transmitted through a fluid under pressure. One of the objects of the invention is to provide a strong and simple speed changing device for transmitting movement from a driver to a driven member. Another object is to yieldingly transmit the power through an air cushion which serves as a shock absorber for the transmission mechanism.

Briefly stated, the simple device I have shown to illustrate the invention may be used to transmit power from the engine to the traction wheels of an automobile, and when so used it will serve as a means for changing the speed of the traction wheels relative to the engine. It will also perform the function of a clutch whereby the traction wheels are connected to and disconnected from the engine. If air, or other elastic fluid, is used in the device, the motion will be yieldingly transmitted from the engine to the traction wheels, and the device will therefore serve as a cushion for the shocks resulting from changes in the load on the engine. The yielding transmission of power is also an advantage in starting the traction wheels.

In the preferred form of the invention, a rotary pump or compressor is used to connect the drive member to the driven member, and the power is transmitted through a fluid confined between the piston and cylinder of the pump. If this fluid is confined and prevented from escaping, the piston and cylinder will turn together, thereby transmitting movement from the drive member to the driven member. If the fluid is permitted to escape freely from the cylinder, the piston will force the fluid through the cylinder without transmitting movement to the driven member. A speed changing valve, controlling the escape of fluid from the cylinder, may be adjusted to change the speed of the driven member relative to the driver, and this valve can also be adjusted to prevent the transmission of movement from the driver to the driven member.

With the foregoing and other objects in view, the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a side elevation of a power transmission device embodying the features of this invention.

Fig. II is a section taken approximately on the line II—II, Fig. I.

Fig. III is a fragmentary section illustrating the discharge passageway and the valve for controlling the discharge of fluid from the cylinder.

Fig. IV is a detail view illustrating a portion of a valve operating device.

Fig. V is a longitudinal section of the power transmission device.

Fig. VI is a fragmentary section illustrating a portion of the rotary piston.

Fig. VII is a detail view, partly in section, showing one of the pressure receiving blades on the piston.

1 designates a rotary drive shaft which may be the crank shaft of an internal combustion engine. 2 designates a driven shaft which may be considered as the propeller shaft of an automobile. To illustrate the invention, I have shown a rotary pump or engine connecting the drive shaft to the driven shaft. A pump cylinder 3 is provided with heads 4 and 5, the head 5 having a sleeve 6 (Figs. I and V) rigidly secured to the driven shaft 2. The piston comprises a circular head 7 (Figs. II and V) rigidly secured to the drive shaft 1, and blades or vanes 8 mounted in slots 9 formed in the piston head.

The blades 8 are movable toward and away from the axis of the piston, and when the device is in service centrifugal force will tend to retain these blades in firm engagement with the circular inner face of 1 the cylinder. The piston also includes rings, or heads, 10 (Fig. V) secured to the opposite sides of the piston head 7 and located adjacent to the cylinder heads 4 and 5. The circular inner face of the cylinder is grooved as shown at 11 in Fig. V, to receive the heads or rings 10. Each of the pressure receiving blades 8 consists of a pair of sections having lapping portions 12 (Figs. II and VII), exposed to the pressure of the fluid in the cylinder. This fluid pressure, acting upon the faces 12' (Fig. VII) tends to force the ends of the blades into engagement with the heads 10.

The drive shaft 1 (Fig. V) is rotatably mounted in the cylinder head 4, and it has an extension 1' rotatably mounted in the head 5. The piston head 7 is mounted eccentrically in the cylinder 3 and separated therefrom to provide a chamber for the fluid, which is preferably air. 12 designates an inlet port (Fig. II) adapted to be closed by a ball check valve 13, and 14 designates discharge ports (Figs. II and III) through which fluid is discharged from the cylinder. Assuming that the fluid is prevented from escaping through the discharge ports 14, if rotary motion is transmitted to the drive shaft 1 and its piston head 7, air will enter the inlet port 12 and this air will be firmly compressed between the piston head and the closed discharge port. As a consequence, the rotary movement of the piston will then be transmitted through the compressed air, to the cylinder, thereby actuating the driven shaft 2 to which the cylinder is secured.

The discharge ports 14 (Figs. II and III) are in free communication with a chamber 15 having an outlet port 16 leading to a valve housing 17. A ball valve 18 (Fig. III) is adapted to coöperate with a long tapering seat 19 to regulate the flow of air from the valve housing 17 to a discharge port 20, said port being in free communication with the atmosphere. 21 designates a spring tending to retain the ball valve 18 in its closed position. 21 designates a valve operating rod, slidably mounted in the valve housing 17, and adapted to engage the valve 18, as shown in Fig. III. To illustrate a means for operating the rod 21, I have shown in Figs. I and V a collar 22 splined to a sleeve 23 on the driven shaft 2, said collar having a finger 24 adapted to engage the outer end of the valve operating rod 21. This collar 22 rotates with the driven shaft 2 to which the cylinder is secured. The means for sliding the collar 22 on the sleeve 23 comprises a lever 25 pivoted at 26 and provided with rollers 27 (Figs. I and V), which lie in an annular groove 28 formed in the periphery of collar 22. A connecting rod 29 (Fig. I) secured to the lever 25 may be operated by hand to slide the collar 22 on the sleeve 23, thereby transmitting longitudinal movement to the valve operating rod 21 (Figs. I and III) associated with the discharge valve 18.

When the discharge valve 18 occupies its closed position, it closes communication between the cylinder and the discharge port 20 leading to the atmosphere. In this event, rotary motion will be transmitted from the piston head 7 on the drive shaft 1, to the cylinder 3 which is secured to the driven shaft 2. At the beginning of the operation, the piston head 7 will turn independently of the cylinder, thereby drawing air through the inlet port 12 (Fig. II) and compressing said air between the piston and the cylinder. Since the air cannot escape from the cylinder, the air pressure will gradually increase, and when the pressure is high enough to overcome the load on the driven shaft 2, rotary motion will be transmitted from the piston, through the compressed air and thence to the cylinder 3, whereby the rotary motion is transmitted to the driven shaft 2. It will be readily understood that the pressure of the compressed air in the cylinder will depend upon the load on the driven shaft 2, and the compressed air will form a shock absorbing cushion through which the rotary motion is yieldingly transmitted to the driven shaft. The valve 18 (Fig. III), which controls the escape of air from the cylinder to the atmosphere, may be adjusted to vary the speed of the driven shaft relative to the drive shaft. If this valve 18 is opened a very slight distance some of the compressed air will be permitted to escape to the atmosphere, and owing to the leakage of air from the cylinder the piston head 7 will then turn faster than the cylinder. The speed of the driven shaft can be therefore varied by adjusting the valve 18.

To stop the driven shaft while the drive shaft is in motion, the valve 18 is moved to a wide open position, thereby permitting the air to escape freely from the cylinder to the atmosphere. The piston will then turn freely in the cylinder without compressing the air therein, and as a consequence the rotary motion will not be transmitted to the cylinder, nor to the driven shaft to which the cylinder is secured.

From the foregoing it will be understood that the transmission device has a clutch whereby the driven shaft may be connected to and disconnected from the drive shaft. The new device also serves as a speed changing power transmission device.

The transmission device can be used as a motor for starting an internal combustion engine. Assuming that the drive shaft 1 is the crank shaft of an internal combustion engine, and that the driven shaft 2 is the propeller shaft for transmitting motion to the traction wheels, if the brakes are applied to the traction wheels the piston 7 may be rotated in the cylinder 3, with the result of transmitting rotary motion to the drive shaft 1 for the purpose of cranking the engine. By referring to Fig. II, it will be seen that the cylinder has an inlet port 30 for the admission of fluid under pressure, and an exhaust port 31 through which this fluid may be discharged from the cylinder. 32 designates a check valve adapted to close the exhaust port 31. If this valve 32 is positively held in its open position, fluid under pressure may be admitted through the inlet port 30 and into the cylinder, where it will act upon the blades 8 to turn the piston independently of the cylinder, thereby imparting a rotary movement to the drive shaft 1. If a blade 8 is located at the inlet port 30, as shown in Fig. II, it will not prevent the delivery of fluid from the port 30. The blade 8 will be forced inwardly by the pressure of the fluid, and the incoming fluid will then act upon the next adjacent blade 8 in advance of the port 30, so as to drive the piston. When the device is used to transmit power from one shaft to the other, the exhaust valve 32 (Fig. II) will be held in its closed position by the pressure of the fluid in the cylinder, and when the piston is driven by fluid pressure admitted through the inlet port 30, this pressure will retain the valve 13 in its closed position. When the cylinder is rotating, centrifugal force will tend to retain the valves 13 and 32 in their closed positions.

The fluid under pressure to be used in driving the device as a motor or engine can be conveniently obtained from an annular air reservoir 33 surrounding the cylinder 3, and preferably formed integral therewith. The transmission device itself can be used as a means for storing the compressed air in the reservoir 33. When the rotary pump is used to transmit rotary motion from one shaft to the other, air is compressed between the piston and cylinder, as previously pointed out, and this compressed air is permitted to enter the valve housing 17, shown in Fig. II. To conduct the compressed air into the reservoir 33, a discharge port 34 is formed in the valve housing 17, and an inlet port 35 is formed in said reservoir, said ports 34 and 35 being in communication with each other as shown in Fig. II. 36 designates a check valve adapted to close the port 34, and 37 is a spring tending to retain said check valve in its closed position. When the device is used for the transmission of power to the driven shaft, compressed air passing from the cylinder will escape past the check valve 36 and enter the reservoir 33. The valve 36 serves as means for confining the compressed air in the reservoir.

To provide for the delivery of compressed air from the reservoir 33 to the inlet port 30, (Fig. II) the reservoir has a discharge port 38 adapted to communicate with a passageway 39 leading to the inlet port 30. 40 designates a check valve normally closing the passageway 39 to prevent the escape of air to the inlet port 30. An operating rod 41 (Fig. II), engaging the valve 40, may be forced inwardly to open said valve. 41' designates a valve operating rod, located diametrically opposite the rod 41 and associated with the exhaust valve 32. When both of the rods 41 and 41' are forced inwardly, the valves 40 and 32 will be displaced to their open positions, and the compressed air escaping from the reservoir will enter the cylinder to operate the piston, as previously pointed out.

The means for operating the rods 41 and 41' (Figs. I, II and IV) comprises a pair of arms 42 extending from the sleeve 23, each of said arms having an inclined cam 43 adapted to engage one of the valve operating rods 41—41'. When the sleeve 23 is moved to the left from the position shown in Fig. I, the cams 43 will coöperate with rods 41 and 41' to open the valves 40 and 32. The sleeve 23 is splined to the driven shaft, as shown most clearly in Fig. V. The sleeve 23 (Fig. I) is provided with an annular groove 44 adapted to receive a roller 45 on the upper end of a lever 46, and this lever may be operated by hand to shift the sleeve 23, thereby transmitting movement to the arms 42 for the purpose of opening the valves 40 and 32. It will thus be seen that the lever 46 can be operated for the purpose of causing the transmission device to serve as a motor in transmitting rotary motion to the drive shaft 1.

To prevent leakage of fluid around the piston 7 (Figs. II and V), a flexible packing member 47 is interposed between the cylinder and the adjacent face of the eccentric piston head 7. This flexible packing member 47 lies in an elongated packing chamber 48 formed in the cylinder, and it has marginal flanges 49 which contact with the walls of this chamber. 50 designates an elongated pressure bar, preferably a piece of rigid metal, located in the packing chamber and arranged between the margin packing flanges 49. A spring 51 (Figs. II and V), arranged in the packing chamber 48, bears against the pressure bar 50 so as to yieldingly force the packing into engagement with the periphery of the piston. Fluid under pressure, passing out of the cylinder through the port 14 and chamber 15, is permitted to flow through a passageway 52 (Fig. II) leading to the packing chamber 48. The pressure bar 50 and the marginal packing flanges 49 are therefore subjected to the pressure of the fluid, and this pressure will firmly force the packing into engagement with the piston 7 and also into engagement with the walls of the packing chamber 48.

I claim:

1. A power transmission device comprising a rotary drive shaft, a rotary driven shaft, a rotary pump through which motion is transmitted from said drive shaft to said driven shaft, said rotary pump having a rotary piston fixed to said drive shaft, and a rotary cylinder fixed to said driven shaft, said rotary piston being arranged within the said rotary cylinder and spaced therefrom to provide a space wherein the fluid is compressed to yieldingly transmit movement from said drive member to said driven member, said rotary cylinder being provided with a discharge port which communicates with the fluid compression chamber and also with the atmosphere, and a speed changing valve operating in said port comprising a tapering valve seat, a ball-valve, a spring tending to keep the said ball seated, and an operating rod coöperating with said ball-valve whereby the said ball may be manipulated to vary the discharge of fluid to the atmosphere.

2. A power transmission device comprising a rotary drive shaft, a rotary driven shaft, a rotary pump through which motion is transmitted from said drive shaft to said driven shaft, said rotary pump having a rotary piston fixed to said drive shaft, and a rotary cylinder fixed to said driven shaft, said rotary piston being arranged within said rotary cylinder and spaced therefrom to provided a space wherein fluid is compressed to yieldingly transmit movement from said drive member to said driven member, said rotary cylinder being provided with a discharge port which communicates with the fluid compression chamber and also with the atmosphere, a speed changing valve device comprising an elongated tapering valve seat, a valve in the form of a ball, a spring tending to keep said ball seated, an operating rod coöperating with said ball whereby the said ball may be manipulated to permit variations in the escape of fluid to the atmosphere, and means controlled by the operator whereby said rod and valve may be operated.

3. A power transmission device comprising a rotary drive shaft, a rotary driven shaft, a rotary pump through which motion is transmitted from said drive shaft to said driven shaft, said rotary pump having a rotary piston fixed to one of said shafts and a rotary cylinder fixed to the other shaft, said rotary piston being arranged within said rotary cylinder and spaced therefrom to provide a space wherein the fluid is compressed to yieldingly transmit movement from said drive member to said driven member, said rotary cylinder being provided with a discharge port communicating with the fluid compression chamber and also with the atmosphere, a speed regulating valve operating in said discharge port whereby the discharge of fluid may be varied, a packing chamber being formed in the inner face of said cylinder, and packing yieldingly mounted in said packing chamber and contacting with the rotary piston, said packing chamber being in communication with said discharge port at a point between said speed regulating valve and compression chamber.

4. A power transmission device comprising a rotary drive shaft, a rotary driven shaft, a rotary pump through which motion is transmitted from said drive shaft to said driven shaft, said rotary pump having a rotary piston fixed to one of said shafts and a rotary cylinder fixed to the other shaft, said rotary piston being arranged within said rotary cylinder and spaced therefrom to provide a space wherein the fluid is compressed to yieldingly transmit movement from said drive member to said driven member, said rotary cylinder being provided with a discharge port communicating with the fluid compression chamber and also with the atmosphere, a speed regulating valve operating in said discharge port whereby the discharge of fluid may be varied, a packing chamber being formed in the inner face of said cylinder, a pressure bar in said packing chamber, and flexible packing between said pressure bar and piston, said flexible packing having marginal flanges which extend between said pressure bar and the walls of said packing chamber, and said packing chamber being in communication with said discharge port at a point between said speed regulating valve and compression chamber.

In testimony that I claim the foregoing I hereunto affix my signature.

WILLIAM L. RINEHART.